(12) United States Patent
Lee et al.

(10) Patent No.: US 7,660,814 B2
(45) Date of Patent: Feb. 9, 2010

(54) TECHNIQUES FOR MAPPING A PHYSICAL TABLE TO MULTIPLE VIRTUAL TABLES

(75) Inventors: Harold Lee, Holly Springs, NC (US); Michael Chaves, Cary, NC (US)

(73) Assignee: Teradata US, Inc., Miamisburg, OH (US)

( * ) Notice: Subject to any disclaimer, the term of this patent is extended or adjusted under 35 U.S.C. 154(b) by 136 days.

(21) Appl. No.: 11/314,776

(22) Filed: Dec. 21, 2005

(65) Prior Publication Data

US 2007/0143572 A1    Jun. 21, 2007

(51) Int. Cl.
*G06F 17/00* (2006.01)

(52) U.S. Cl. ............................. 707/102; 707/2; 707/10

(58) Field of Classification Search ........................ None
See application file for complete search history.

(56) References Cited

U.S. PATENT DOCUMENTS

| | | | |
|---|---|---|---|
| 5,241,648 A | 8/1993 | Cheng et al. | |
| 5,758,335 A | 5/1998 | Gray | |
| 5,983,215 A | 11/1999 | Ross et al. | |
| 5,987,453 A | 11/1999 | Krishna et al. | |
| 6,446,063 B1 | 9/2002 | Chen et al. | |
| 6,477,527 B2* | 11/2002 | Carey et al. | 707/4 |
| 6,505,188 B1 | 1/2003 | Ghazal et al. | |
| 6,665,680 B2* | 12/2003 | Sharp et al. | 707/100 |
| 6,792,414 B2* | 9/2004 | Chaudhuri et al. | 707/2 |
| 6,801,904 B2* | 10/2004 | Chaudhuri et al. | 707/2 |
| 6,996,558 B2* | 2/2006 | Dettinger et al. | 707/4 |
| 7,079,980 B2* | 7/2006 | Muraoka | 702/182 |
| 7,146,356 B2* | 12/2006 | Choi et al. | 707/3 |
| 7,177,866 B2* | 2/2007 | Holenstein et al. | 707/8 |
| 2003/0061205 A1* | 3/2003 | Cleghorn et al. | 707/3 |
| 2004/0073538 A1* | 4/2004 | Leishman et al. | 707/3 |
| 2004/0254916 A1* | 12/2004 | Dettinger et al. | 707/3 |
| 2005/0071326 A1* | 3/2005 | Brown et al. | 707/3 |
| 2006/0041539 A1* | 2/2006 | Matchett et al. | 707/3 |
| 2006/0271586 A1* | 11/2006 | Federighi et al. | 707/102 |
| 2007/0078822 A1* | 4/2007 | Cucerzan et al. | 707/3 |
| 2007/0150483 A1* | 6/2007 | Goldman et al. | 707/10 |
| 2007/0192296 A1* | 8/2007 | Burger et al. | 707/3 |

* cited by examiner

*Primary Examiner*—Mohammad Ali
*Assistant Examiner*—John P Hocker
(74) *Attorney, Agent, or Firm*—Schwegman, Lundberg & Woessner

(57) ABSTRACT

Techniques are presented for mapping a physical table to multiple virtual tables. One or more fields within a results set from a query are mapped or associated to one or more virtual tables. The virtual tables are organized as sub graphs and connected together as a set. A reference to the set is provided to a table join analysis service and a join is performed against the set to produce a single logical reference to a table. The single table reference may be treated as a single table for purposes of subsequent search and retrieval by a searcher.

10 Claims, 3 Drawing Sheets

TECHNIQUES FOR MAPPING A PHYSICAL TABLE TO MULTIPLE VIRTUAL TABLES

FIELD

The invention relates generally to search and retrieval and more particularly to techniques for mapping a physical table to multiple virtual tables.

BACKGROUND

Modern databases provided a convenient mechanism for enterprises to store and organize their information or data. Generally, logical data or information associated with one aspect of the enterprise is organized within its own independent table. A table includes its own schema or definition and includes a plurality of fields organized within the table as rows and columns.

Query languages permit users to search the database against a single table or against multiple tables for purposes of returning results that comply with the search criteria or search terms. In some cases, the results may be voluminous or may span multiple disparate tables housed in the database.

In such situations, the users often like to issue new searches against the results returned. But, in order for this to be achieved the results have to be defined as a single table within the database. The problem is each result may be associated with an entirely different database table definition. This also necessitates that services of the database perform a join on the different associated table definitions that are included within the results.

One technique to address this entails pre-establishing within the database definitions or schemas for likely combinations of fields that a search may yield by way of results. This may work for a general or popular search on a few different database tables, but it will not work for all possible combinations. Moreover, the permutations associated with various combinations of fields included within the database may not practically be accounted for in predefined table definitions. As a result, often results from a custom search are not available as a unique single table from which the user can continue to search and interact with. This means the user may have to issue more creative searches or be more technically savvy to achieve what he/she originally intended to do with the original search and its subsequent results.

Thus, it can be seen that improved techniques for processing results associated with search queries are desirable.

SUMMARY

In various embodiments, techniques for mapping a physical table to multiple virtual tables are provided. In an embodiment, one or more concepts from different physical data store tables are identified for a query search results set. One or more collections of the concepts are then mapped to their own virtual table and a handle to a new results table is returned for further interaction. The new results table joins each of the virtual tables into the new results table.

DETAILED DESCRIPTION

Figure 1:
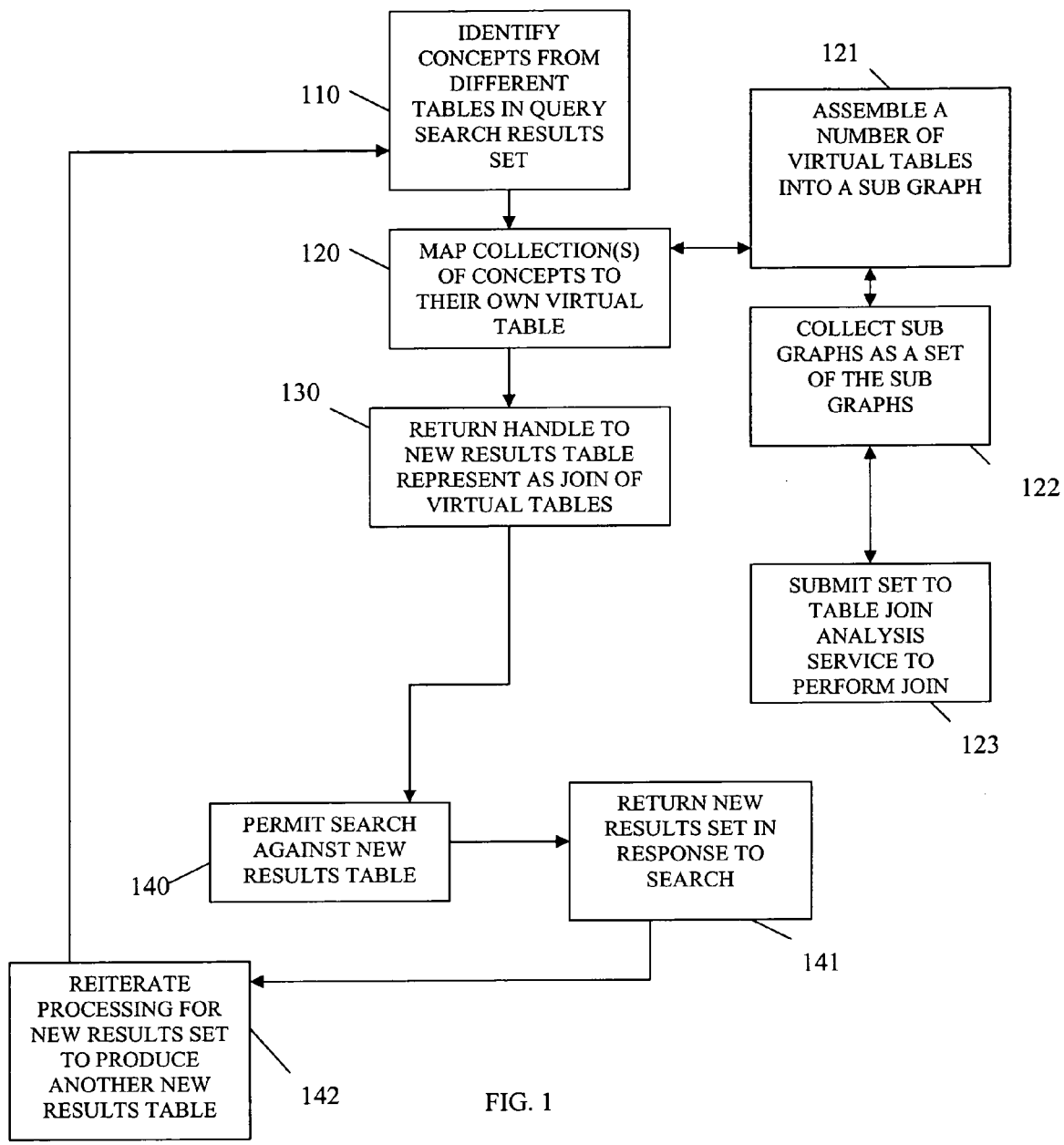
FIG. 1 is a diagram of a method for associating a single table with multiple virtual tables, according to an example embodiment.

FIG. 1 is a diagram of a method 100 for associating a single table with multiple virtual tables, according to an example embodiment. The method 100 (hereinafter "virtual table mapping service") is implemented in a machine-accessible or computer-readable medium and is accessible over a network. The network may be wired, wireless, or a combination of wired and wireless.

As used herein a "data store" may include a database, a collection of databases organized as a data warehouse, a directory, a collection of directories, or various combinations of these items. The data store includes a variety of physical tables, each physical table having its own schema or data definition defining its fields, rows, and columns.

Initially, each concept or each collection of concepts in the data store associated with a plurality of same or disparate tables has a single schema or single data definition created for that concept or concept collection within the data store, such that the concept or concept collection appears to be associated with its own independent table. These concept table definitions are referred to as virtual tables.

A concept may be viewed as a logical or business association within the data store. For example, the concept of INDIVIDUAL may include a variety of columns from a same data table or a variety of data tables within a data store; these columns may include CUSTOMER_ID and HOUSEHOLD_ID. A concept may be combined with other concepts as well for purposes of establishing a virtual table. So, the INDIVIDUAL concept may be combined with a STORE concept that includes a single STORE_ID column. In such a case, the INDIVIDUAL concept may be joined with other tables that include the CUSTOMER_ID and HOUSEHOLD_ID columns or the INDIVIDUAL concept may be joined with other tables that include just the STORE_ID column. When a join is achievable via an overlapping column or field between two or more tables then those tables are said to be capable of being mapped with one another.

A concept may also be viewed as a logical collection of one or more fields/columns from the data store. A concept associates portions of a same table or of different tables with one another and provides a logical link between different tables, since the different tables share at least one same field/column with one another. Again, this link permits the tables to be joined within one another.

At 110, the virtual table mapping service identifies one or more concepts that appear in tables returned from a search query. The combined returned tables and their columns or fields appear in the results set from the search query. The columns or fields may be inspected to identify concepts of collections of concepts, which are also identified in the data store as being virtual tables.

It is noted that any particular table within the results set may be associated with a plurality of concepts or virtual table definitions. That is, unlike conventional approaches a single physical table is associated with the teachings herein and below with two or more virtual tables. In fact, the only limit on the number of virtual tables that may be associated with any particular table is the total number of available virtual table definitions housed in the data store.

At 120, the virtual table mapping service maps or associates each concept or collection of concepts identified in the data stores and included within the results set as its own independent virtual table. Each virtual table has its own schema or table definition within the data store.

According to an embodiment, at 121, the virtual table mapping service assembles a number of the virtual tables having similar concepts into a sub graph. At 122, sub graphs are collected as a connected set of sub graphs. The virtual table mapping service then, at 123, submits the set to a table join analysis service to perform a join against the connected set of sub graphs. The table join analysis service may be an existing table join operation that has been modified to handle the set and perform the join against the plurality of sub graphs representing the multiple virtual tables.

At 130, in response to joining the virtual tables, the virtual table mapping service returns a handle to a new results table. The new results table represents the join of the virtual tables; and the handle is returned to a user or an automated application that initially performed the search query against the data store and in response to that search query acquired the results set.

At this point the searcher (user or automated application) may, at 140, perform a new search against the new results table using the handle as a single table reference. The search is performed as a query against the table joined from the connected set of sub graphs, each sub graph includes one or more virtual tables and the virtual tables are derived as concepts included in the tables and identified in the data store by way of virtual table definitions or schemas.

At 141, in response to the search against the joined table a new results set is returned. At 142, the entire processing of the virtual table mapping service may be reiterated a second time to produce another new results table having a new handle. This recursion or iteration may interactively occur, such that the searcher can continue to interact and mine the results.

It is now appreciated, how single results set may be mapped to a plurality of virtual tables and associated with a single referenced table handle. Moreover, a single physical table may be associated with multiple virtual tables. The virtual tables account for the permutations of columns in a searcher's initial results set and are identified as being concepts or collections of concepts having prior data definitions within the data store.

In this manner, there is no need to develop data definitions for a few select results sets or expected tables and then attempting to map those data definitions to a searcher's query results, which has been the conventional approach; rather, the searcher's query results are dynamically mined and collections of existing concepts are formed, connected, and joined into a single results table using existing virtual table definitions housed within the data store.

Figure 2:
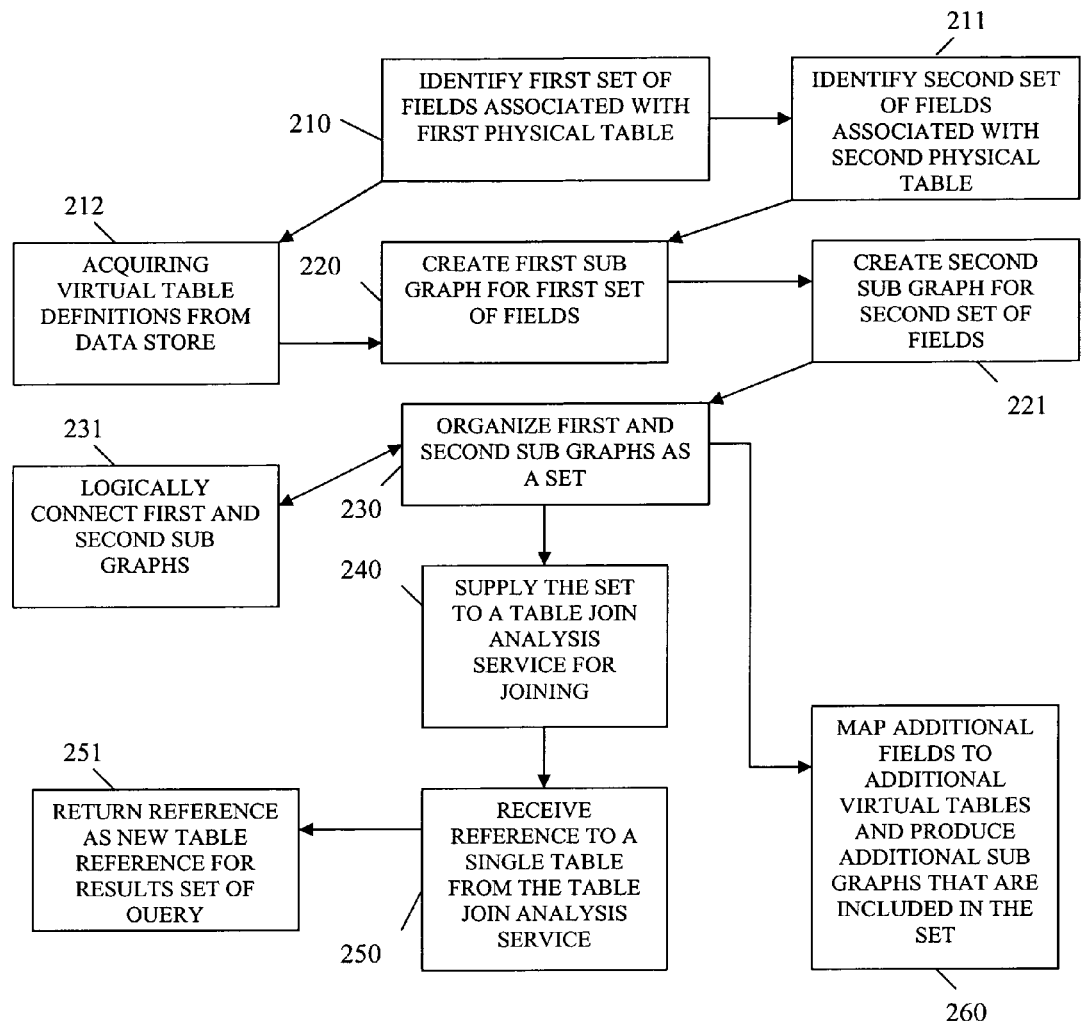
FIG. 2 is a diagram of another method for associating a single table with multiple virtual tables, according to an example embodiment.

FIG. 2 is a diagram of another method 200 for associating a single table with multiple virtual tables, according to an example embodiment. The method 200 (hereinafter "joining service") is implemented in a machine-accessible and readable medium and is accessible over a network. The network may be wired, wireless, or a combination of wired and wireless. In an embodiment, the joining service represents a different processing perspective of the virtual table mapping service represented by the method 100 of FIG. 1.

The joining service prepares a results set from a search query for processing by a table join analysis service. This is done by inspecting the results set for collections of fields that can be associated as concepts and mapped to existing virtual table definitions within a data store.

Collections of identified virtual tables are then organized as sub graphs and the sub graphs organized as a set of connected sub graphs. The reference to the set is then passed to the table join analysis service. The table join analysis service then performs a join for purposes of forming a single results table definition. Furthermore, the joined and single results table may be subsequently used by a searcher for purposes of performing additional queries.

It is within this context that the FIG. 2 and the joining service are now discussed. Accordingly, at 210, the joining service identifies from a results set of a search query a first set of fields (columns) associated with a first physical table included in the results set. Again, the set of fields may also be viewed as data store concepts, as was discussed above with respect to the method 100 of the FIG. 1. The first set of fields is associated with one or more first virtual tables.

At 211, the joining service also identifies a second set of fields associated with a second physical table. Again, the fields and the physical table are identified within the results set of a search query performed. The second set of fields is also associated with one or more second virtual tables.

According to an embodiment, the virtual tables are identified and mapped by acquiring pre-existing virtual table definitions from the data store for each of the sets. This may be done by identifying the first set as being a predefined concept within the data store having predefined first table definitions or first schemas. Similarly, the second set is associated with second table definitions or second schemas within the data store.

At 220, the joining service creates a first sub graph for the first set of fields. This connects in a first sub graph the first set of fields, such that any particular portion may be reached by traversing the first sub graph and all edges derived from the first sub graph.

In a similar manner, at 221, the joining service creates a second sub graph for the second set of fields. Again, this connects the second sub graph the second set of fields, such that any particular portion may be reached by traversing the second sub graph and all edges derived from the second sub graph.

After the first and second sub graphs are derived from the assembled first and second virtual tables, at 230, the joining service organizes the first and second sub graphs as a connect set of sub graphs. That is, at 231, the first and second sub graphs are logically connect via a common field or set of fields appearing somewhere in each of the sub graphs.

At 240, the joining service supplies the set of connected sub graphs to a table joining analysis service via reference to the set as a whole. The table joining analysis service uses that set reference to join the first virtual table and the second virtual table represented within the set of sub graphs.

After the set of sub graphs are joined by the table joining analysis service, at 250, the joining service receives a reference to a single table from the table joining analysis service. This single table and its reference logically refer to the searcher's results set for the searcher's initial search query against the data store.

So, the single table is then used, at 251, by the joining service to return a reference as a new table reference for the results set of the initial query against the data store. That is, the joined virtual tables may be searched as a single table via the new table reference.

It is noted that conventionally such a situation has not been practical or feasible with existing techniques because the approach has been to attempt to predefine the most popular permutations an initial results set may yield from a data store query and create table definitions for those popular permutations. Moreover, conventionally it was deemed infeasible to predefine all possible permutations as data definitions.

These conventional problems are solved with the joining service because the connect set of sub graphs permit the data definition for the results set to be formed from collections of existing virtual table definitions. Thus, all permutations do not have to be predefined; rather they may be derived from collections of virtual table definitions that are connected as a set of sub graphs.

In an embodiment, at 260, the joining service may also map additional fields or collections of fields to additional virtual tables from the initial results set and produce additional sub graphs. These additional sub graphs may also be connected within the set of sub graphs and included in the single joined table and its associated and derived table definition. So, as many virtual tables as are present in the initial results set may be mined from the results set and organized as two or more sub graphs within the connected set.

Figure 3:
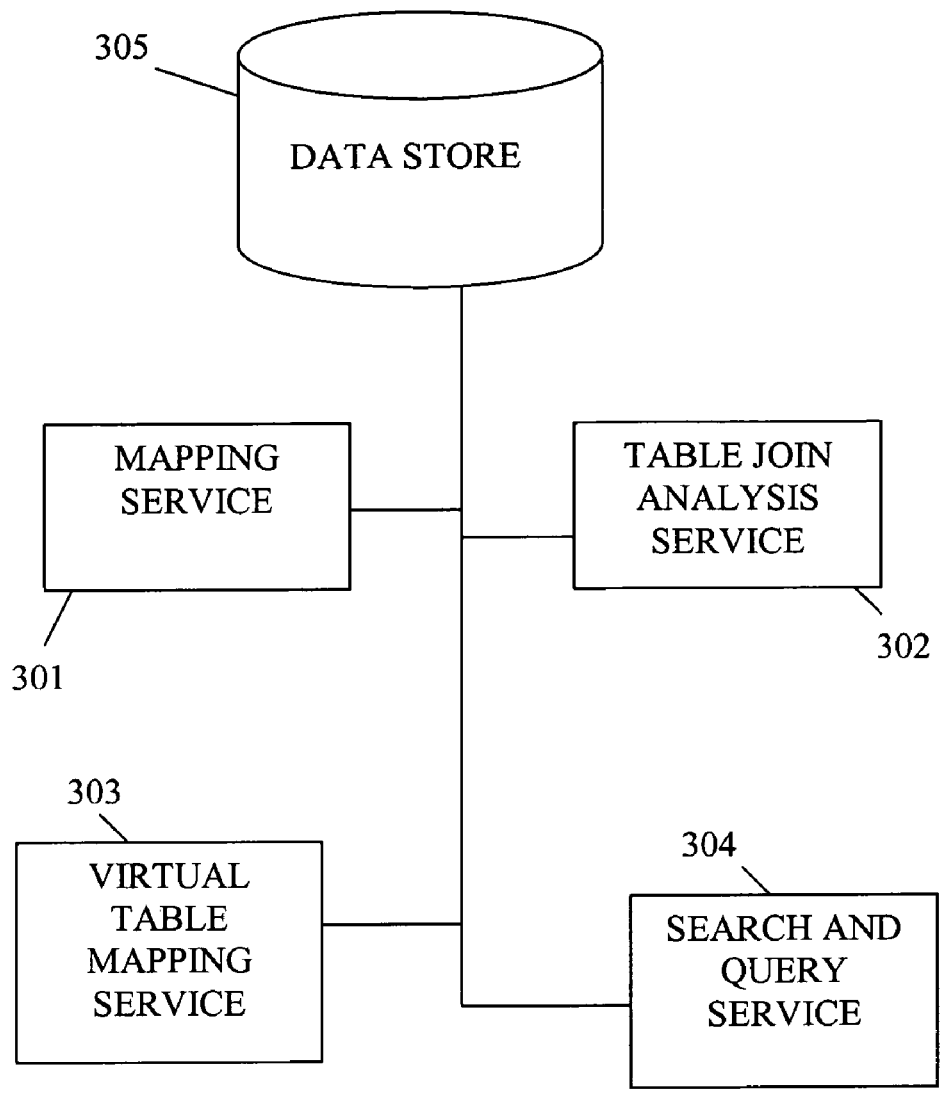
FIG. 3 is a diagram of a virtual table mapping system, according to an example embodiment.

FIG. 3 is a diagram of a virtual table mapping system 300, according to an example embodiment. The virtual table mapping system 300 is implemented in a machine-accessible and readable medium and is operational over a network. The network may be wired, wireless, or a combination of wired and wireless. In an embodiment, portions of the virtual table mapping system 300 implements, among other things the services by the methods 100 and 200 of the FIGS. 1 and 2, respectively.

The virtual table mapping system 300 includes a mapping service 301 and a table join analysis service 302. In some embodiments, the virtual table mapping system 300 may also include a virtual table creation service 303, a search and query service 304, and/or a data store 304. Each of these will now be discussed in turn.

The mapping service 301, during its operation, maps one or more fields of same or different physical tables to its own virtual table definition and virtual table reference. It is noted that a same physical table within the results set may have multiple virtual tables mapped to it. The physical tables and the fields are acquired from a results set of a search query against the data store 305. The mapping service 301 iterates the results set for multiple mappings that establish multiple virtual tables being defined within the results set. Moreover, the mapping service 301 is invoked when a results set is returned.

In an embodiment, the mapping service 301 identifies concepts included within the results set; these concepts represent the logical collections of the fields. Furthermore, the concepts have predefined table definitions within a data store 305. The definition and use of the term concept was described above with respect to the virtual table mapping service represented by the method 100 of the FIG. 1.

The mapping service 301 also organizes the virtual tables as a set of connected sub graphs from which any edge or permutation associated with the sub graphs may be derived.

Examples of a mapping service 301 and its operations were presented above with respect to various aspects of the methods 100 and 200 of the FIGS. 1 and 2, respectively.

The table join analysis service 302 receives a reference to a set of sub graphs and performs a join on the virtual tables included therein to produce a single reference to a new table. The table join analysis 302 is to treat each of the sub graphs within the set as an independent logical table for purposes of the join.

According to an embodiment, the table join analysis service 302 is implemented as a modified version of an existing table join analysis service, which is adapted to receive sub graphs organized as a connected set reference and to process the join from the sub graphs by traversing edges of the connected set reference.

After the table join analysis service 302 produces the reference to the new table it is supplied to the mapping service 301. The mapping service 301 then supplies the reference to a searcher. The searcher is now able to treat the collection of disparate tables and fields associated with the original results set as a single entity for purposes of further searching and manipulation.

According to an embodiment, the virtual table mapping system 300 may also include a virtual table creation service 303. The virtual table creation service 303 is used to initial populate a data store 305 with the virtual table definitions. The virtual table definitions may be viewed as concepts or as collections of concepts. The virtual table creation service processes in advance of the mapping service 301 and supplies a foundation within the data store 305 for the mapping service 301.

The virtual table mapping system 300 may also include a search and query service 304. The search and query service 304 may be viewed as a data store interface that permits a searcher to construct queries and manipulate the results sets. Moreover, the search and query service 304 permits a searcher (user or automated application) to use the single reference produced from the join of the table join analysis service 302 to search a previously acquired results set from a previous issued query.

It is also noted that the processing of the virtual table mapping system 300 may iterate for as many iterations as the searcher dictates. That is, the searcher may continue to refine and manipulate his results set. In a processing iteration, the results set is mapped to a single table reference by breaking tables included within the results set into collections of mapped virtual tables organized as sub graphs. The sub graphs are then logically linked as a connected set of sub graphs and supplied to the table join analysis service 302.

The virtual table mapping system 300 may also include a data store 305. The data store 305 may be a database, a collection of databases organized as a data warehouse, a directory, a collection of directories, or various combinations of these resources. In an embodiment, the data store 305 is a Teradata® warehouse product or service distributed by NCR. Corporation of Dayton, Ohio.

It is however appreciated that any data store 305 may be modified for purposes of the teachings presented here, without departing from the teachings. Essentially, the data store 305 is the backbone which houses or stores the enterprise data and table definitions/schemas associated with the enterprise data. Moreover, a number of the table definitions/schemas are associated with virtual table definitions while others are associated with physical table definitions.

Searchers issue queries against the data store 305. Any virtual table creation service 303, which may be optionally present, populates the data store 305 with virtual table definitions (concept definitions or collections of concept definitions). The mapping service 301 uses the data store 305 to identify the virtual table definitions from an initial results set. The initial results set is the result of a searcher's query. The table join analysis 302 uses the set of sub graphs produced by the mapping service 301 to derive a table definition for the data store 305 from permutations discovered or derived from within the set of sub graphs.

One now appreciates how a results set from a search query may be organized as a set of virtual tables depicted within a connected set of sub graphs. A join service then joins the sub graphs to a single referenced table. A searcher can use the single table as if it were a single entity for purposes of subsequent search and retrieval operations. Thus, each permutation within results set of a search may be derived and represented within the single table such is not the case with conventional approaches. Also, a single physical table may be mapped or associated with multiple virtual tables within the sub graphs.

Furthermore, the techniques presented herein allow a join service to perform a more efficient join on the tables comprised in the results set because a single physical table may be represented as a plurality of mapped virtual tables.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer-implemented method to process on a computer, comprising:

identifying a plurality of concepts from different physical data store tables associated with a query search results set, the concepts are logical collections of fields and columns defined in the data store tables that share at least one same field and one same column with one another across the data store tables and that are derived from the data store tables;

mapping a plurality of collections of the concepts to their own virtual table associated with virtual table definitions in a data store by mining the query search results using pre-existing table definitions for each collection, the virtual tables represent permutations of the columns in the query search results set and the virtual table definitions are predefined associations in the data store that are independent of the data store tables and are identified via the pre-existing table definitions for each collection;

returning a handle to a new results table;

performing a search against the new results table via the handle the new results table joins each of the virtual tables into the new results table, the handle used as a single table reference for new searching against multiple virtual table definitions derived from the original query search results, and the concepts or collections of the concepts are logical associations identified within the data store that provides linkages between the different physical data store tables;

assembling a number of the virtual tables into a sub graph representing the virtual tables within the query search results set;

collecting the sub graph and other sub graphs as a set of sub graphs; and submitting the set of sub graphs to a table join analysis service that performs the join from the set of sub graphs and produces the new results table.

2. The method of claim 1 further comprising, permitting a search of the new results table via a single reference to the new results table.

3. The method of claim 2 further comprising, returning a new results set in response to the search.

4. The method of claim 3 further comprising, reiterating the processing of the method for the new results set to produce another new results table for manipulation of the new results set.

5. A computer-implemented method to process on a computer, comprising:

mining query search results for a user using pre-existing data store table definitions for concepts that identify a first set of fields associated with a first physical table and a second set of fields associated with a second physical table;

creating a first sub graph for the first set of fields, each node of the first sub graph represents a different virtual table;

creating a second sub graph for the second set of fields, each node of the second sub graph represents a different virtual table;

organizing the first and second sub graphs as a set;

supplying the set to a table join analysis service for joining; and returning the set as a single handle to the query search results of the user that the user then accesses to acquire the concepts in the query search results, each concept logically derived from the virtual tables using the pre-existing data store table definitions, and the concepts are logical collections of fields and columns defined in tables that share at least one same field and one same column with one another across the tables and that are derived from the tables, and wherein the virtual tables account for permutations of columns in the query search results and virtual table definitions for the virtual tables are predefined associations in a data store that are independent of the first physical table.

6. The method of claim 5 further comprising, receiving a reference to a single table from the table join analysis service in response to supplying the set.

7. The method of claim 6 further comprising, returning the reference as a new table reference for a results set of a search query, wherein the first set of fields and the second set of fields were results returned in response to that search query.

8. The method of claim 5 further comprising:

mapping additional fields associated with additional tables to additional different virtual tables; and producing additional sub graphs that are included in the set.

9. The method of claim 5, wherein creating further includes acquiring each virtual table from the data store that includes an independent table definition for each virtual table, and each table definition representing one or more concepts.

10. The method of claim 5 further comprising, logically connecting the first sub graph with the second sub graph within the set before providing the set to the table join analysis service.

* * * * *